United States Patent [19]
Brown

[11] Patent Number: 5,197,776
[45] Date of Patent: Mar. 30, 1993

[54] SEATING/BED ARRANGEMENT FOR RECREATIONAL VEHICLES

[76] Inventor: Thomas H. Brown, 77 Lorne Avenue, Newmarket, Ontario, Canada

[21] Appl. No.: 848,201

[22] Filed: Mar. 10, 1992

[51] Int. Cl.$^5$ .............................................. B60N 1/08
[52] U.S. Cl. ................................... 296/65.1; 297/257
[58] Field of Search ................. 296/65.1, 64; 297/232, 297/257

[56] References Cited

U.S. PATENT DOCUMENTS

| | | | |
|---|---|---|---|
| 2,839,312 | 6/1958 | Barenyi et al. | 296/65.1 |
| 4,341,415 | 7/1982 | Braun et al. | 296/65.1 |
| 5,088,135 | 2/1992 | Violette | 297/257 |

Primary Examiner—Robert R. Song
Attorney, Agent, or Firm—Jane Parsons

[57] ABSTRACT

A seating/bed arrangement for a motor home utilizes freestanding seats which may be moved from place to place within a recreational vehicle. The seats securable to fixed members of the vehicle by latches in various configurations, for example as an L-shaped settee, two oppositely facing seats, two one-behind-the-other seats or as a bed. A single fixed member of the vehicle and a single latch per seat may allow for the majority of the desirable configurations but an additional latch may be provided, notably for the L-shaped settee configuration. When two seats are aligned, it is possible to form at least a full sized double bed by extending the seat fortioins forwards. A table may also be utilized in the bed configuration and the table may be provided with a dual purpose leg to support the table either as a table or as part of the bed.

19 Claims, 13 Drawing Sheets

SEATING/BED ARRANGEMENT FOR RECREATIONAL VEHICLES

BACKGROUND OF THE INVENTION

1. Field of the Invention

This invention relates to seating arrangements within recreational vehicles, which seating arrangements are convertible from one configuration to at least one other configuration.

2. Acknowledgement of the Prior Art

There are a great many seating arrangements which are convertible to bed arrangements available for recreational vehicles. Some seating arrangements which are convertible between configurations are known for multi-person transport such as buses or trains.

Examples of convertible seating arrangements or convertible bed/seating arrangements or convertible bed arrangements in recreational vehicles, passenger vehicles or even in domestic living quarters are as follows.

Hanemaayer in U.S. Pat. No. 4,550,946 issued on Nov. 5, 1985 discloses a compact motor van in which four single seats convert into two single beds with space between them. The single seats pivot on central pivots so that they may be arranged to face forward during transport of the vehicle, and may be pivoted to face each other for social times when the vehicle is at rest, and may have their seat portions alignable and extensible for conversion into beds.

Onimaru et al in U.S. Pat. No. 4,802,706 issued on Feb. 7, 1989 discloses a pivotable seat which may be pivoted from a forward facing driving position to an angled position on opening of the door.

Kawashima in U.S. Pat. No. 4,792,188 issued on Dec. 20, 1988 discloses another swivel seat for a vehicle.

Joslyn et al in U.S. Pat. No. 3,964,713 issued on Jun. 27, 1976 discloses yet another swivel seat arrangement.

Maguire in U.S. Pat. No. 3,076,977 issued Feb. 12, 1963 discloses a convertible sleeping arrangement which is not intended for use in recreational vehicles. Maguire is concerned with an arrangement of beds which may be located to form a L-shape in a corner if desired.

Ziegenfuss in U.S. Pat. No. 2,495,494 issued Jan. 24, 1950 discloses another such arrangement of beds which may be arranged in a corner at right angles if desired. Again, the Ziegenfuss arrangement is not intended for recreational vehicles.

Sherbert et al in U.S. Pat. No. 3,455,597 issued Jul. 15, 1969 discloses an arrangement for a passenger vehicle where two-person seats may be arranged either longitudinally against a wall of the vehicle or may be arranged in forward facing pairs. The seats are swivelled about a suitably located pivot for this purpose.

Known practical arrangements in conventional recreational vehicles include arrangements where a two or three-person settee is located longitudinally, the seat back portion of the settee is located against the outside of the vehicle. Such a settee may be converted to a double bed by a mechanism that allows the seats and the set backs to be located with their planes continuous and horizontal to form a bed base. Such mechanism has, in the past, been somewhat complex and support for the full area of the bed base must be provided.

Another seating/bed arrangement in use involves two facing two-person seats across the vehicle, i.e. perpendicular to the longitudinal axis of the vehicle, usually with a table between them. In this arrangement, the table may be lowered to seat level and loose back support cushions from the seat may be used to complete the mattress.

Passenger vehicles for multi-person use sometimes have seats with back rests which may be swung from side to side of the seat to convert seating arrangements from pairs of oppositely facing seats to seats which are all facing in the same direction.

The above discussion of known arrangements is intended to be merely exemplary of the large number of seating arrangements of which are available in a large variety of environments. In spite of the apparent plethora of choice of seating arrangements a problem remains.

Where space is limited in a recreational vehicle a L-shaped seating arrangement is desirable for social times when the vehicle is at rest. Such an arrangement is believed to be space saving and, moreover, it is also psychologically more restful than an in line arrangement down one side of the vehicle. Such an arrangement is, however, not conducive to easy conversion into a suitable bed.

Many jurisdictions have rules as to the orientation of seats for passengers during travel of the vehicle. Sometimes such seats must all be facing forwards. They also inhibit easy design considerations for time spent within the vehicle when it is at rest.

The present inventor has addressed these problems.

SUMMARY OF THE INVENTION

According to the invention there is provided a seating arrangement for a recreational vehicle having at least one freestanding seat provided with means for individually re-positioning and securing the seat within the vehicle, the seat comprising a seat portion, a back, and a frame; comprising means for individually repositioning and securing the seat comprising a latch to releasably secure each seat to a fixed member of the vehicle;

means to open the latch to release the seat for movement to a new position; and means to close the latch to secure the seat in a closed position.

This invention will be described particularly in relation to recreational vehicles of the motor home type. Thus, the invention is generally described in reference to road vehicles which are self propelled probably having a gasoline or diesel engine and which have living accommodation in the body of the vehicle. It is clear however that the invention is applicable to other recreational vehicles such as camping trailers, boats, trains. It may even be applicable to general domestic living accommodation of the non-transportable type, such as a house or to that type of domestic living trailer etc.

The fixed member for each seat may be a post upstanding from the floor located to be engagable with the seat in any or a variety of positions of the seat.

The latch may be carried by either a suitably located member of the seat frame or by the fixed member of the vehicle and may be openable and closable to engage about the other of the member of the seat frame or the fixed member of the vehicle. Thus, if the fixed member is a post upstanding from the floor of the vehicle, the latch may engage about the post and be carried on a member of the seat frame, such as a front cross bar of the frame. The latch may comprise two parts pivoted together, one part of which is fixed and the other part of which is movable. The movable part may be pivoted to allow opening and closing of the latch about the post by means of a manually operable draw bar. The draw bar may project forward through an aperture in the front cross member of the frame to be easily accessible by the user. Suitable positions of the seats to provide versatile arrangements thereof may be such that, a) the seats are aligned along one side of the vehicle, b) the seats are arranged in a L-shape to one another so that one of them projects transverse of the vehicle, c) facing one another transverse to the longitudinal axis of the vehicle, and d) one behind the other both facing forwards.

When the seats are facing one another it may be convenient to provide a table between them either in a conventional manner or, preferably, in a manner to be herein after described. Such a table may be lowered to the level of the seats to extend between them to form the mid-section of a double bed although the versatility of the invention makes it possible to avoid such an arrangement. It is quite possible that when this arrangement is used the table may rest on a lip projecting forwardly of each seat in as conventional manner. However, it is preferable that the table be provided with its own support means which is adaptable to hold it either in its table position or in its lowered position to form the mid-section of a bed.

The table may comprise a table top having a front edge and a rear edge. The rear edge may include lugs locatable in sockets in a wall of the vehicle at a level commensurate with use as a table. A dual purpose leg is pivoted to the table and comprises a long leg portion having a length corresponding to the desired height of the table when used as a table, and a short leg portion having a length corresponding to the height of the table when utilized as part of a bed.

The long leg portion is pivoted to an underside of the table to move between a position at right angles to the plane of the table to support it and a position folded flat against the table. The short leg portion is pivoted to the long leg portion and is pivotable between a) a position flat against the table when the long leg portion is also folded flat against the table, b) a position at right angles to the table when the long leg portion is folded flat against the table, and c) a position extending as a diagonal strut between the table and the long leg portion when the long leg portion is at right angles to the table.

A more preferred bed arrangement is produced by extending the seat portions of two aligned seats forwardly. One suitable mechanism for changing the slats to a bed is manufactured by Flexsteel Industries Inc. of Dubuque, Iowa, U.S.A. A large double bed is possible in this manner.

The lugs at the rear edge of the table may be slidable in respective generally vertical grooves to locate the table in a vertical folded away position. The grooves may have sufficient slope to encourage maintenance of the table in folded away position.

BRIEF DESCRIPTION OF THE DRAWINGS

Embodiments of the invention will now be described by way of example with reference to the drawings in which.

DETAILED DESCRIPTION OF PREFERRED EMBODIMENTS

Figure 1:
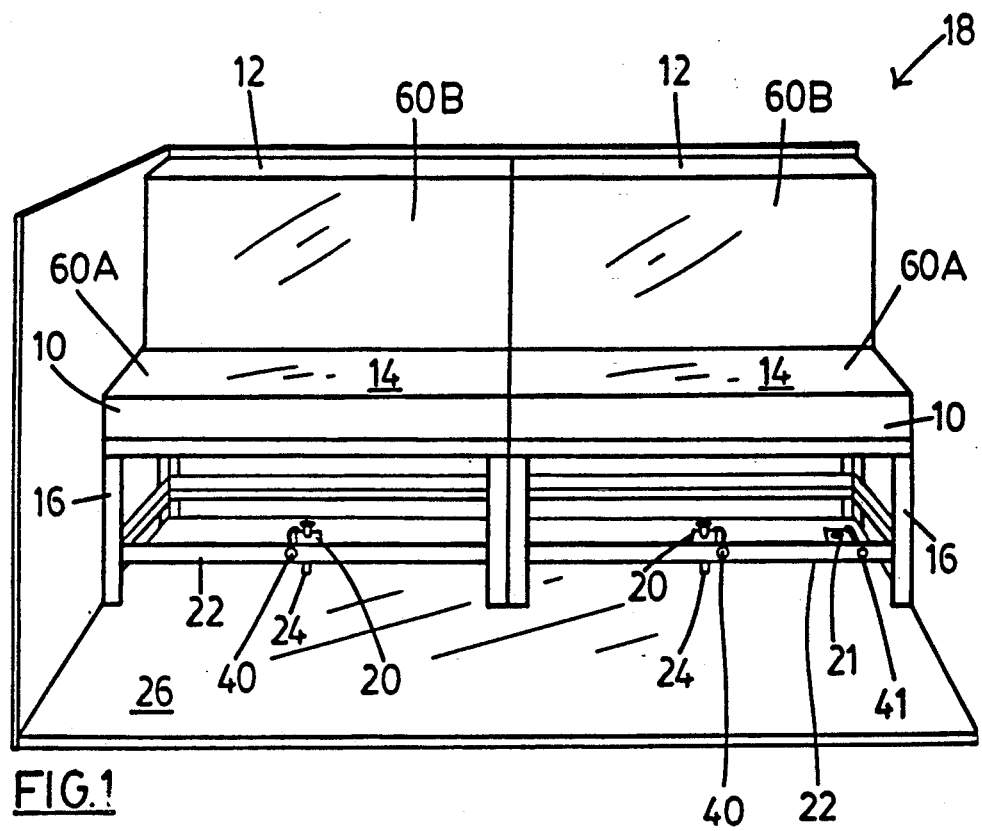
FIG. 1 shows one form of seating arrangement which is achievable by mean of the present invention.
Figure 2:
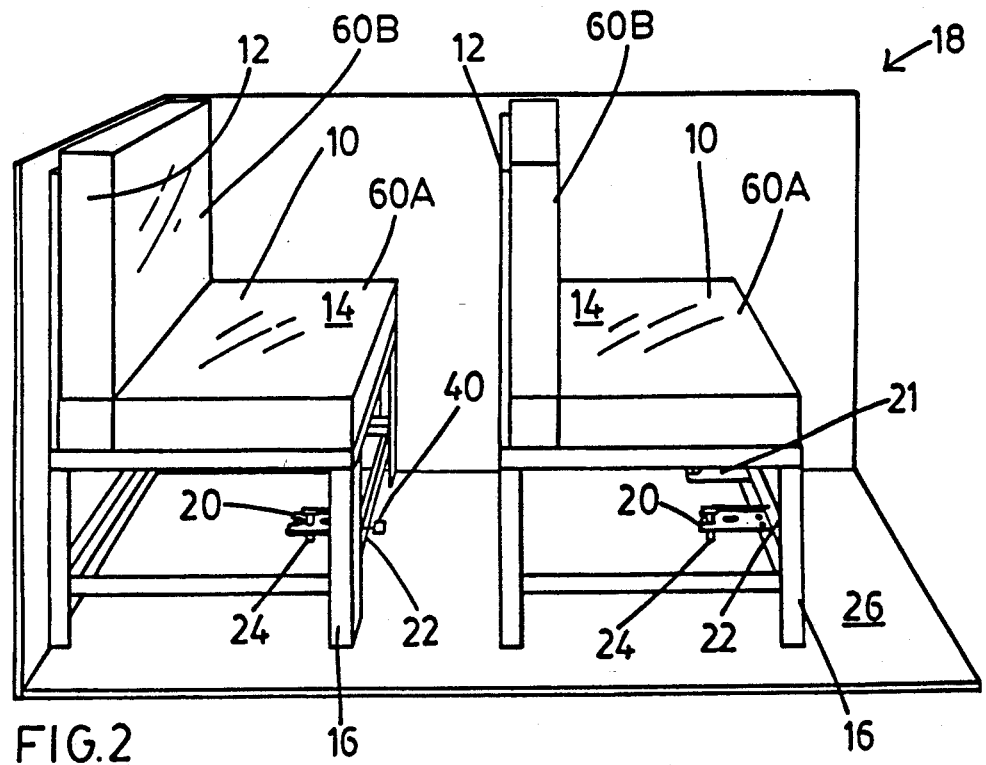
FIG. 2 shows another form of seating arrangement which is achievable by means of the present invention.
Figure 3:
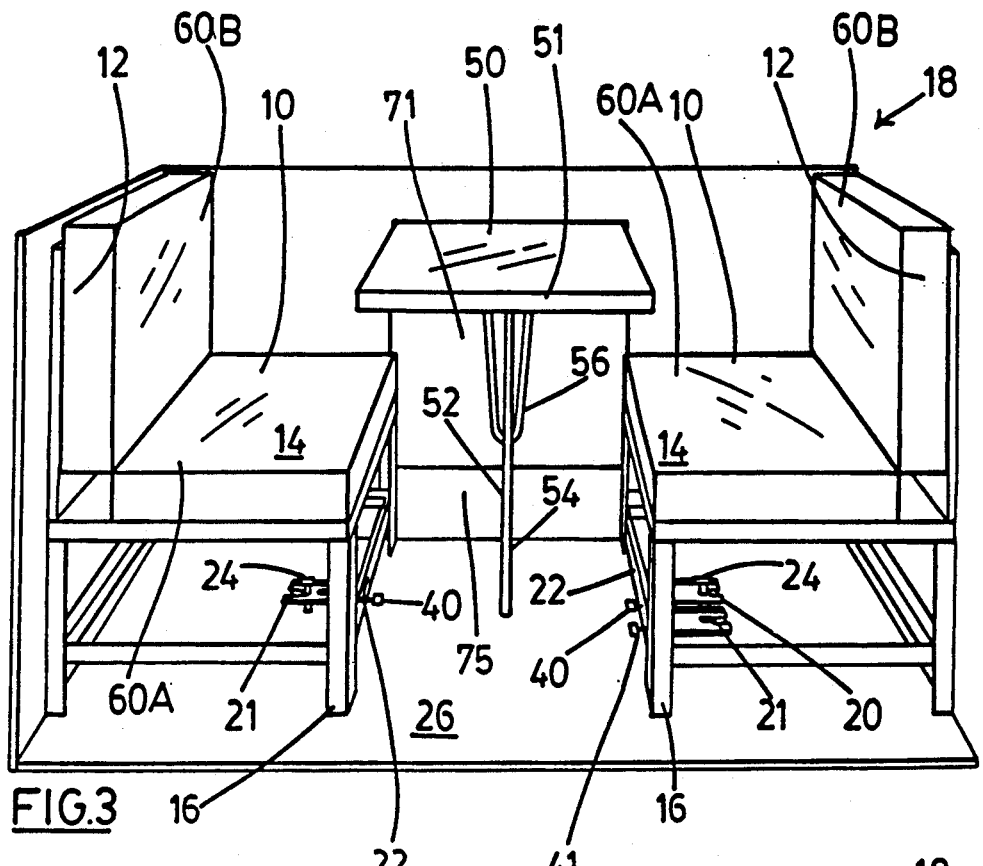
FIG. 3 shows another form of seating arrangement which is achievable by the present invention and incorporating a table.

The drawings show a pair of two-person seats 10 which may be movable between a variety of positions to form a variety of configurations. Each seat comprises a back portion 12 a seat portion 14 a frame 16. Each seat 10 is essentially movable within its environment to stand where desired. Cushions 60 are provided for each seat 10. Each cushion 60 may comprise a seat portion 60A and a squab portion 60B each extending the full length of the seat and hinged together. Loose cushions or other cushion arrangements may be possible.

When the seats 10 are to be used in a recreational vehicle generally indicated as 18, which is to be transported from place to place, they should be fixed at least during transportation.

According to the present invention they may be fixed in a variety of different positions, for example, as shown in FIGS. 1-6. One suitable mechanism for fixing them in position is illustrated in more detail in FIGS. 7-11.

A latch 20 may be provided attached to any suitable part of frame 16. Very suitably the latch may be attached to a front cross bar 22 of frame 16 where it easily accessible.

The latch 20 may co-operate and latch with a bolt 24 upstanding from the floor 26 of the recreational vehicle 18. For purposes of strength of construction it is very suitable that the bolt be screwed into a screw threaded aperture or socket in a plate 28, very suitably a steel plate, which overlies a considerable portion of the floor 26 of the recreational vehicle. The plate 28 may normally be covered by floor covering material 42 and will not be visible in the living quarters of the vehicle.

Figure 4:
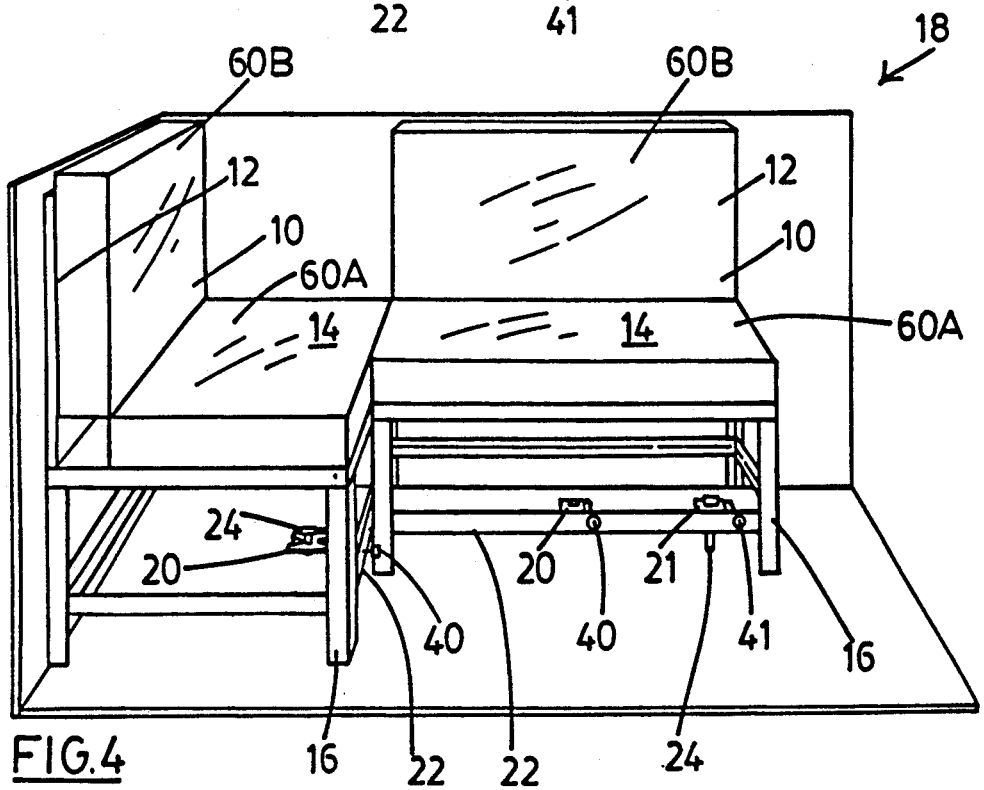
FIG. 4 shows yet another form of seating arrangement which is achievable by the present invention.
Figure 5:
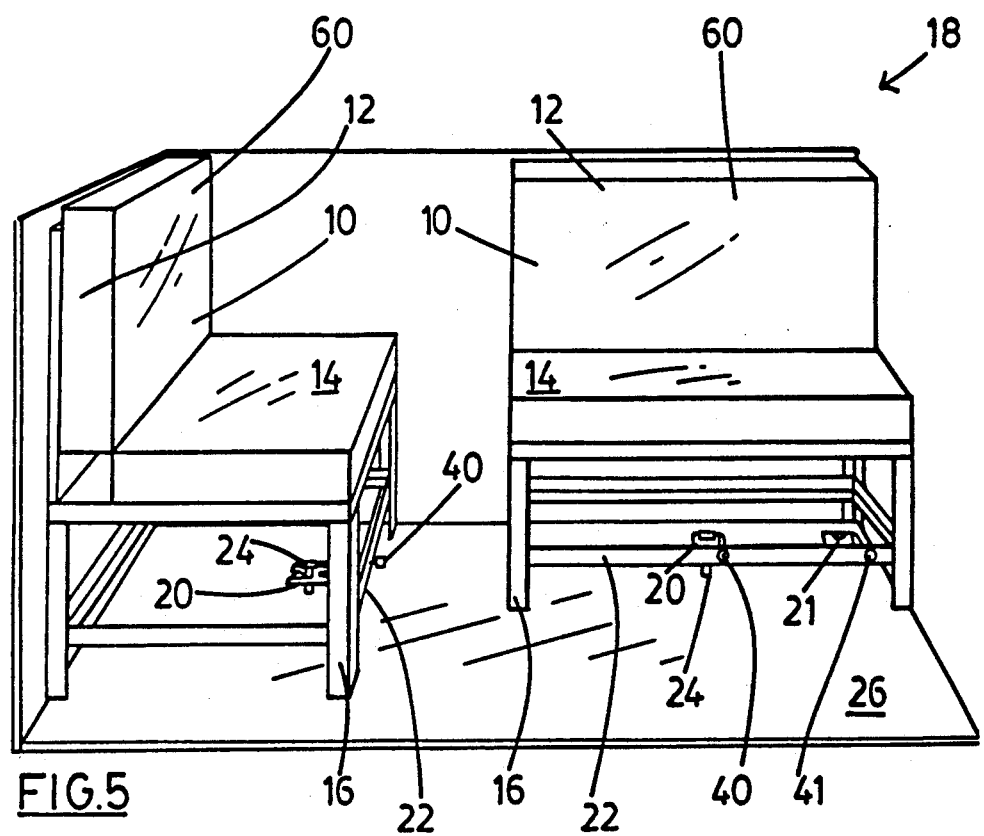
FIG. 5 shows still further seating arrangement which is achievable by means of the present invention.

For the configurations shown in FIGS. 1-3, 5 and 6, a single bolt 24 may be provided for each of the seats 10 and a single latch 20 may be suitably positioned on each of the seats 10 for co-operation and latching with the bolt 24. If the configuration of FIG. 4 is to be used it is necessary to provide a second latch 21 since the location of the seat 10 is such that the latch 20 is out of reach of bolt 24. It is of course possible to provide a second bolt instead of a second latch 21 but such bolt will upstand from the floor and may be inconvenient to the passengers in some positions of the seat.

Any suitable latching mechanism may be used between the recreational vehicle and the seats and the latch may of course, be positioned on either of the seat or of the recreational vehicle itself. Thus, it is possible to conceive of a situation where the latch is located on the bolt 24 and locks onto the cross bar 22 of the seat.

Conveniently the latch is a two part latch, one body part 32 of which is fixed and the other catch part 34 of which pivots on the body part 32.

Body part 32 may be bolted directly to the cross bar 22 or it may be welded to it or it may be welded to another part of the frame 16.

Operation of the latch may be by means of draw bar 36 passing through aperture 38 of cross bar 22 of frame 16. Draw bar 36 may be manually operable through knob 40.

The normal position of knob 40 is flush with the front surface of cross bar 22 in the closed position of the latch. This gives an indication to the user that the latch is closed. If the knob 40 is in any other position, then the latch is probably not closed properly and investigation is required. Additional latch 21 is provided to allow the seat configuration of FIG. 4, this latch is similarly provided with fixed body part 33, catch part 35 (similar to catch part 34 of latch 20), draw bar 37 and knob 41. Its operation is similar to that of latch 20. Thus, it can be seen in FIG. 11 that knob 40 is advanced from cross bar 22, but in FIG. 10 it is flush against it. The mechanism of the latch as illustrated is a particularly convenient mechanism but it is clear that other latch mechanisms are possible.

It will be noted that the latches 20 shown on the two seats 10 which are illustrated have draw bars 36 provided on different sides of the respective latch 20. The reason for this is to provide ready accessibility for the configuration of FIG. 4. If both draw bars were located to the same side of their respective latches 20, then one or other of them would be underneath the adjacent seat and not so readily accessible. The location of the draw bars 36 is a matter of choice.

The actual position of latch 20, 21 as illustrated requires that the drawbar 36, 37 be pulled forward at an angle to open the latch 20, 21. In this arrangement, fork shaped catch 34 first pivots about post 24 and withdraws from it in the direction of the arrow A from the position shown in FIG. 10 to that shown in FIG. 11. The fork shape of the catch 34 is shown in broken lines in FIG. 11 for clarity.

Figure 11:
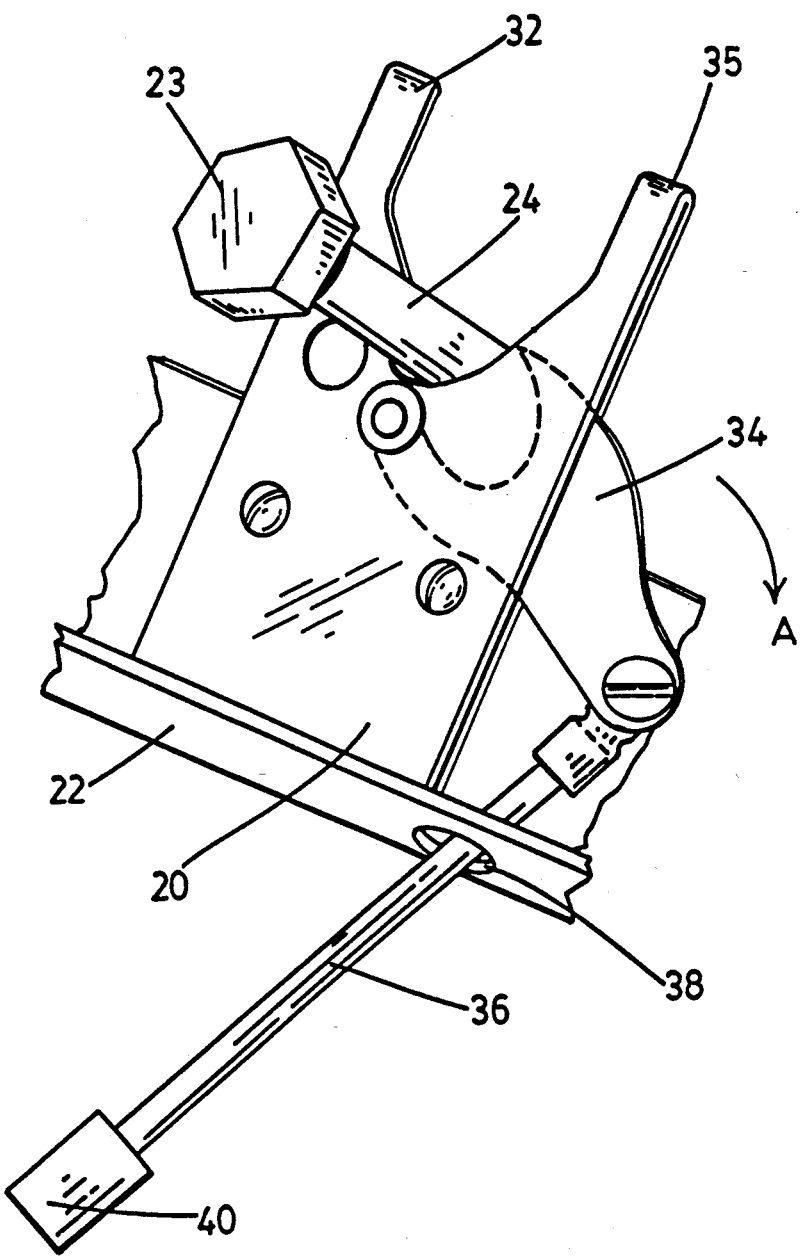
FIG. 11 shows the latch of FIG. 9 in open position.

If pivot point 37 between draw bar 36 and catch 34 were a fixed pivot, this withdrawing action would not take place and the forks of catch 34 might foul the U-shaped slot of fixed U-shaped latch body 32. The withdrawal of the forks of catch 34 as illustrated in FIG. 11, may, however, allow unimpeded passage of bolt 24 into and out of the U-slot of latch body 32.

Figure 12:
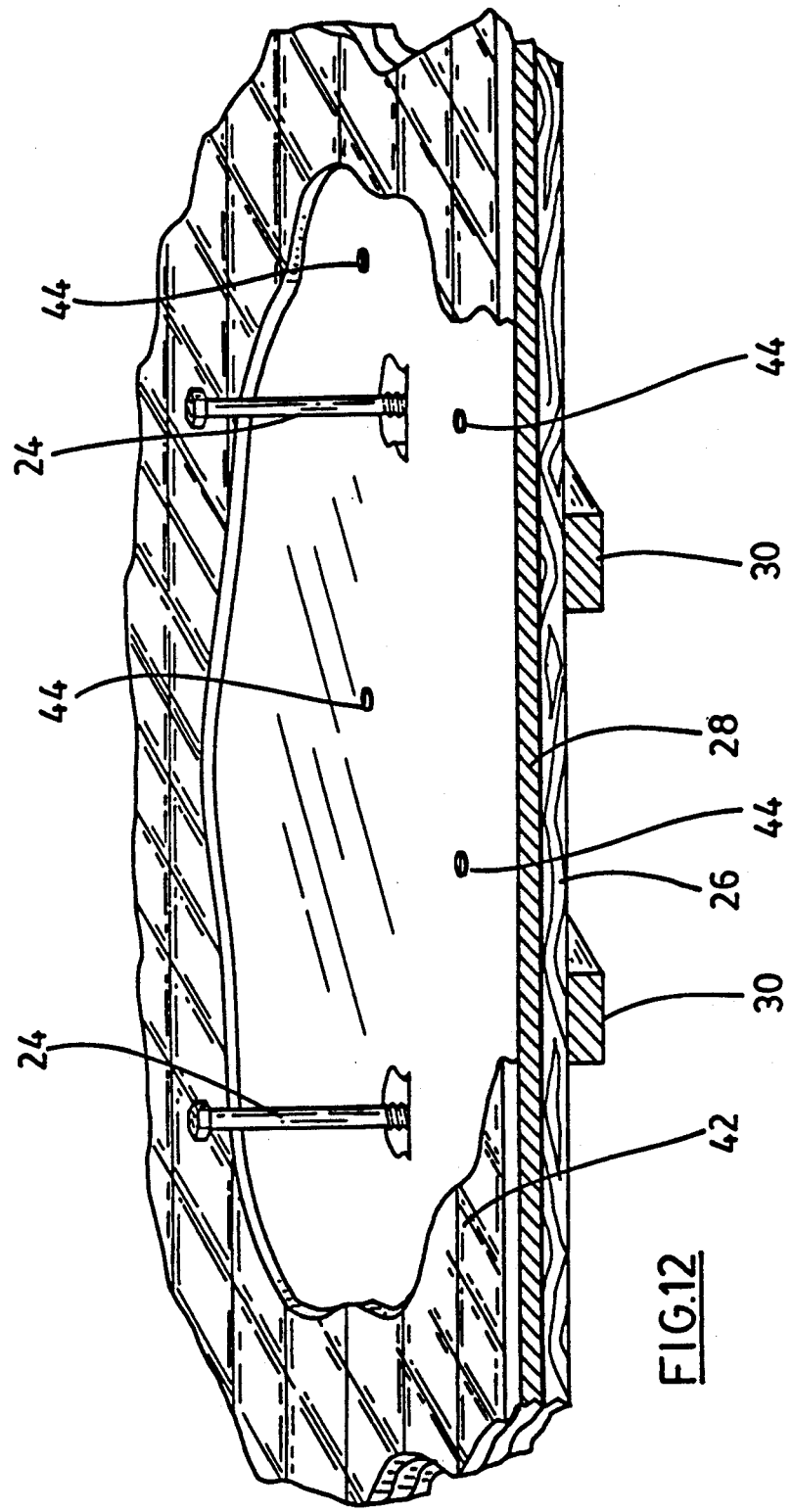
FIG. 12 shows the fixed member of the vehicle in the floor being partially broken away to show the attachment of the fixed member.

FIG. 12 shows details of plate 28 having screw threaded holes therein into which bolts 24 are screwed. Floor covering 42 is provided over metal plate 28 which may overlie or underlie any wooden or custom flooring 26 in the recreational vehicle itself. When the metal plate 28 overlies such floor 26 it is probably bolted to the structural member by means of bolts 44. When the plate 28 under lies the floor 26 it may conveniently be welded to the structural members 30.

Conveniently bolts 24 have enlarged heads 23 so that any jolting of the recreational vehicle is unlikely to jolt the latches upwardly out of engagement with them. The heads 23 may be hexagonal heads to aid fixing the bolts 24.

In addition to the latching mechanisms, it may be convenient to provide for plug and socket engagement between adjoining seats 10, or between seats 10 and adjoining walls. Thus, lugs 80 projecting rearwardly from the seat frame 16 may fit into holes 81 (see FIG. 14) in the vehicle wall to locate the seat in proper position for latching. Similarly, lugs 82 may latch into sockets in adjoining seat frame 16 for the configuration of FIG. 1 or FIG. 4 to locate the seats relative to each other.

These seats 10 may be easily moved between various configurations. For example, to move the seats from the configuration of FIG. 1, knob 40 (or 41) is pulled to operate draw bar 36 to pivot catch 34 the direction of arrow A so that it opens the rearwardly directed U-slot of latch body 32. The seat 10 may then be moved forward to slide bolt 24 out of the U-slot of latch body 32. The seat may now be moved to a new location so that it is ready for engagement in, for example, any of the configurations of FIGS. 1, 3, 4, or 5. Proper location of latch 20 with bolt 24 may be assured by location of lugs 80 and 82 in the sockets provided for the various configurations. Catch 34 is then closed around bolt 24 by pushing knob 40, 41 back to its original position to pivot catch 34 and to move it in the opposite direction of arrow A shown in FIG. 11. Thus, Knob 40, 41 will once again be flush with cross member 22.

Figure 15:
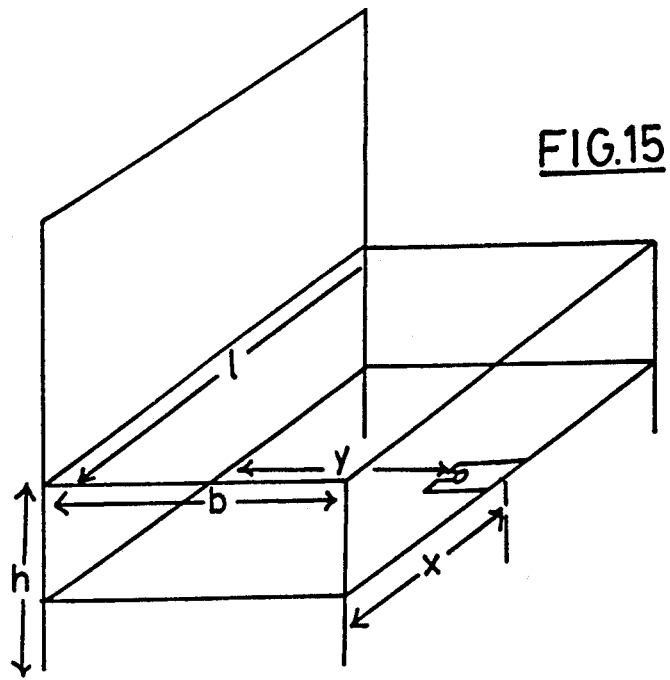
FIG. 15 is a sketch indicating suitable relative locations of the latch.
Figure 16:
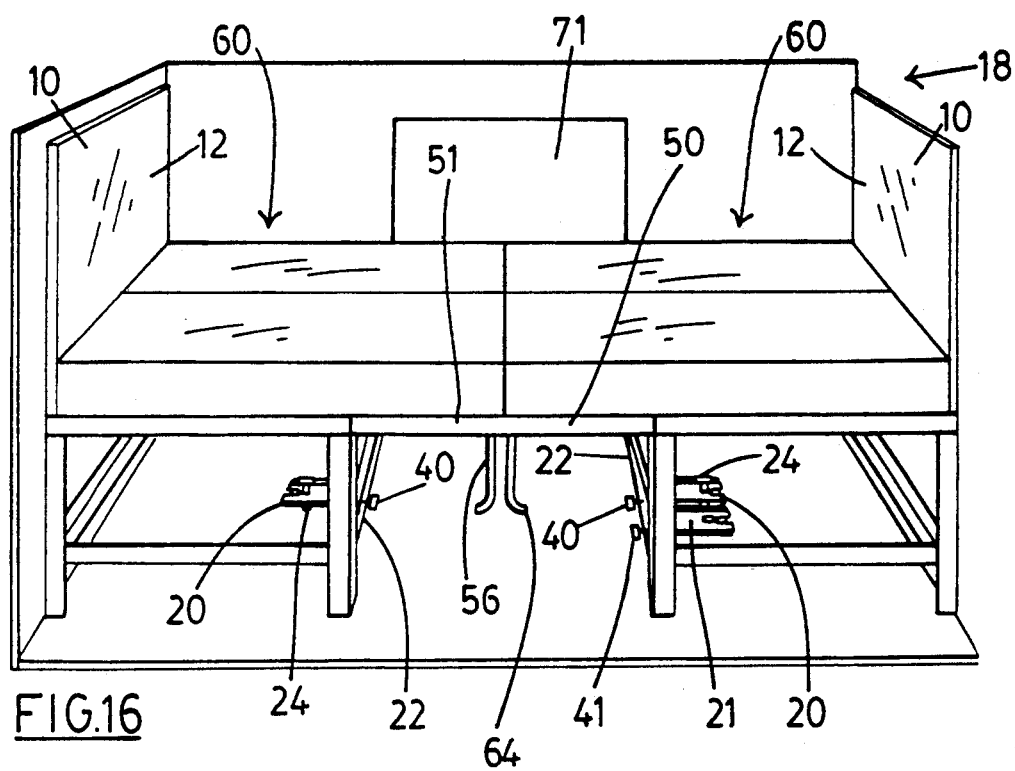
FIG. 16 shows a less preferred bed arrangement.

An important feature of the invention is the relative locations of the bolts 24 and the latches 20 of the seat 10. If all the configurations illustrated in FIGS. 1-3, 5 and 6 are to be possible utilizing only one bolt 25 for each two-person seat, then the geometry of the location and the latches are paramount. If the configuration of FIG. 4 is also to be achievable, it is necessary to provide a second latch on the seat 10 which is moved to be adjacent to an already located seat to form the L-shaped configuration. This second latch 21 is positioned to engage the respective bolt 24 when the seats are properly located and its location is dependant on the dimensions of the seat bases. Each two-person seat may have a breadth b from front to back and a length 1 from side to side and a height h from floor to seat. For each seat 10, its respective bolt should be located mid way along its length, i.e. at a distance $x = \frac{1}{2}$ from the end of each seat 10. Each bolt 24 must also be located a similar distance $y = \frac{1}{2}$ from the back of the respective seat 10. In practical terms, y is usually the distance from a wall of the vehicle, unless the seat is not to be located against a wall. It may be seen from FIG. 15 that the distance y is not necessarily equal to the breadth of the seat b. Indeed, it may be preferred that the bolt and the latch are located under the seat. The latch 20 may be set back from the frame such that $$x = y = \frac{1}{2}$$

Thus, the seat may overhang the frame and the latch may be further set back from the frame.

Figure 6:
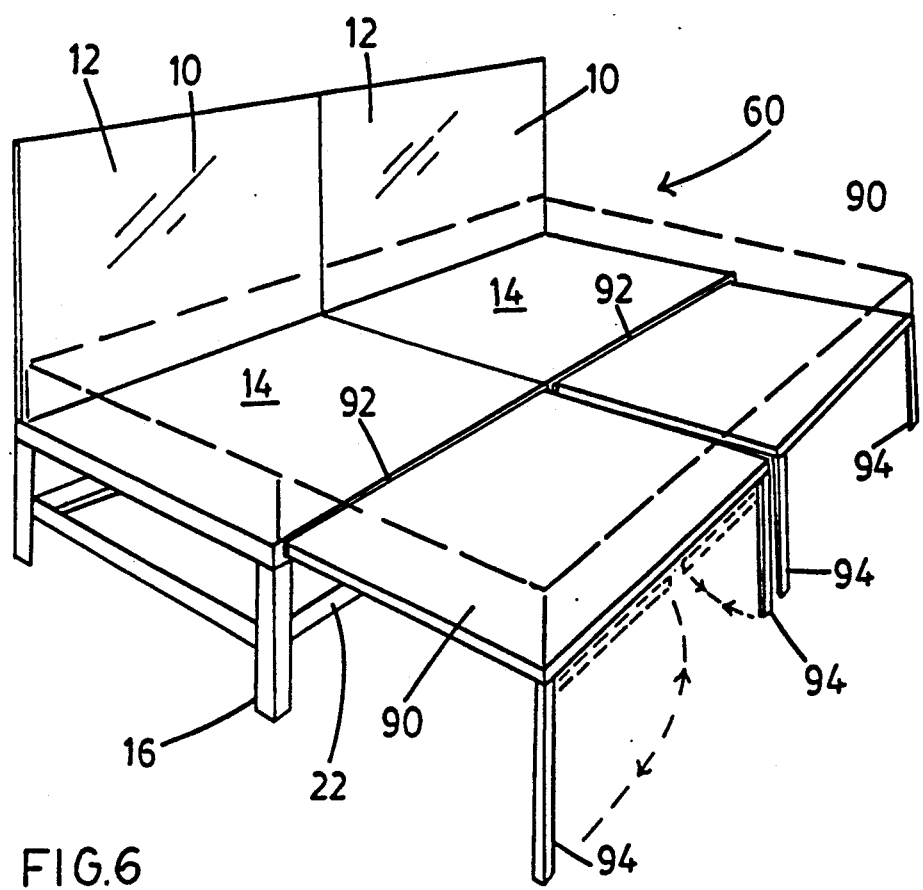
FIG. 6 show a bed arrangement which is achievable by means of the present invention.
Figure 7:
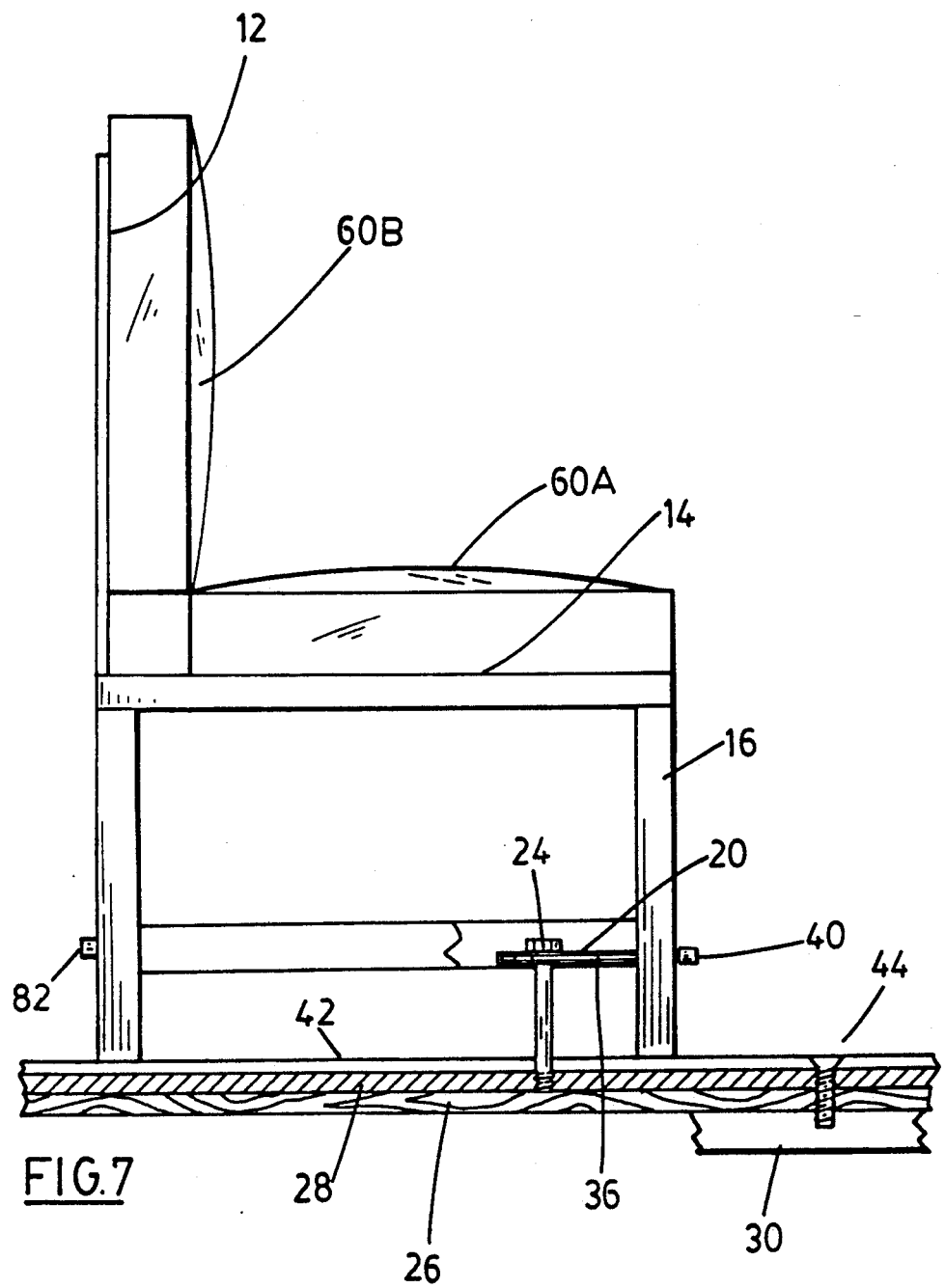
FIG. 7 shows very schematically a means of securing a seating arrangement for example that illustrated in FIGS. 1 to 6.
Figure 8:
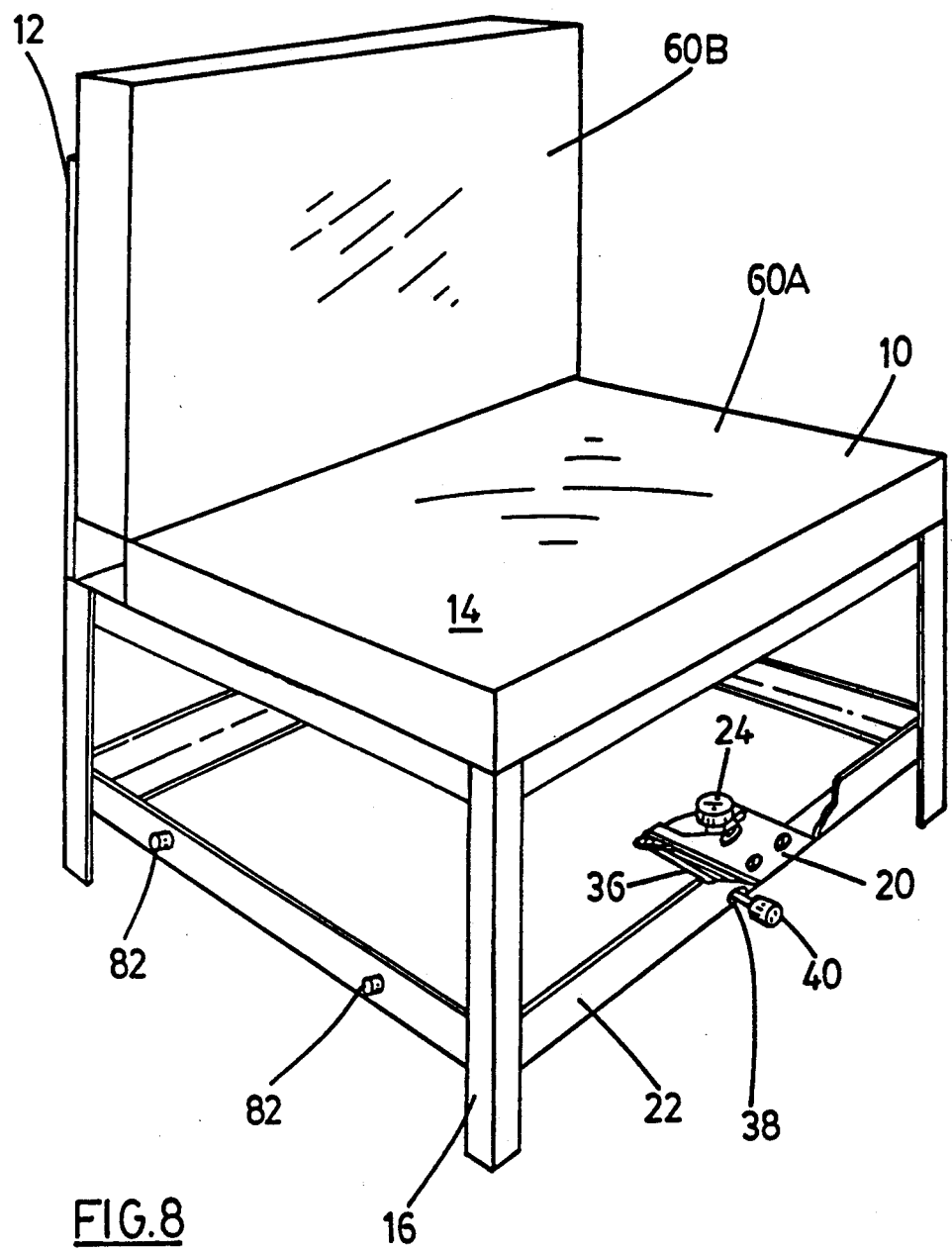
FIG. 8 is a perspective view from the front of the arrangement shown in FIG. 7 partially broken away to show details of the latch.
Figure 9:
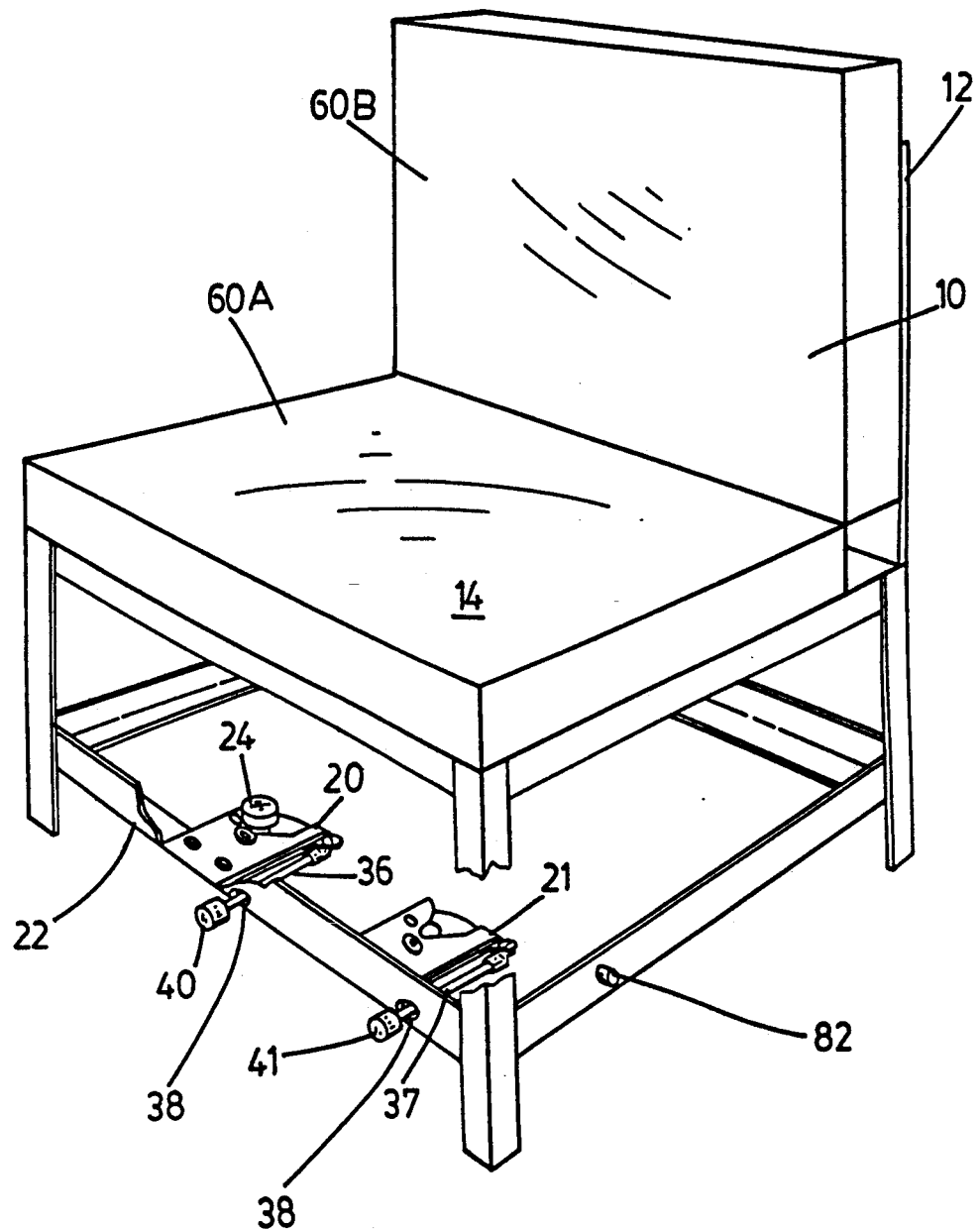
FIG. 9 is a view similar to that of FIG. 8 showing a seat with an additional latch.
Figure 10:
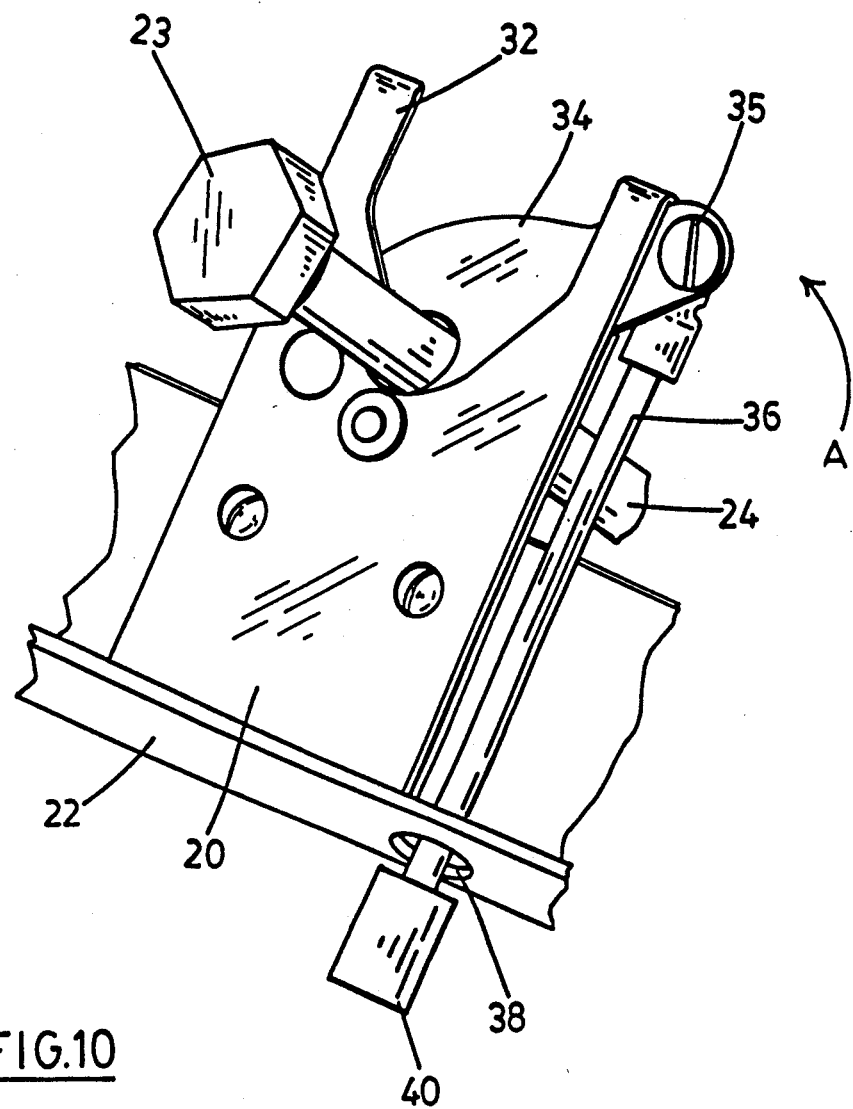
FIG. 10 shows the latch of FIGS. 7 and 8 in greater detail in closed position.

When the seats are to be converted into a bed the configuration of FIG. 1 is used. FIG. 6 illustrates an extremely simplistic conversion of the FIG. 1 arrangement into a bed. As shown, a bed extension 90 which is normally housed under each seat portion 14 when used as a seat, is slid out of slot 92. Legs 94 are pivoted to support a free end of extension 90 and seat cushions 60 are arranged so that seat cushion 60A and squab 60B are laid flat over seat portion 14 and extension 90. A large double bed, queen bed, or larger bed may be obtained in this manner. While the illustrated embodiment shows extension 90 slidable out of frame 16, it will be appreciated that it might be hinged over it or a considerably more complex mechanism might be provided so that cantilevered or other mechanism may be easily operated to extend the bed position the legs and arrange the cushions as a mattress. Any conventional bed settee mechanism may be used provided that it allows access and operability with latches 20, 21. The configuration of FIG. 3 includes a table 50 having a dual purpose support and leg 52. The dual purpose support and leg 52 comprises a long leg portion 54 and a short leg portion 56 which acts as a diagonal bracing strut when the table is in the high position shown in FIG. 3.

The table is movable between three positions, 1) folded away, 2) as a table, and, 3) as part of the bed base. Tables with such uses have been previously provided by means of a pivoting leg and ledges on the seats to support the table when it is in use as part of the bed base. Such an arrangement is, of course, possible, but improvement may be possible by means of illustrated embodiment In fact, use of the table as part of a bed is less preferred in the present invention due to an appreciation that people are reluctant to use a table as part of a bed.

Figure 13:
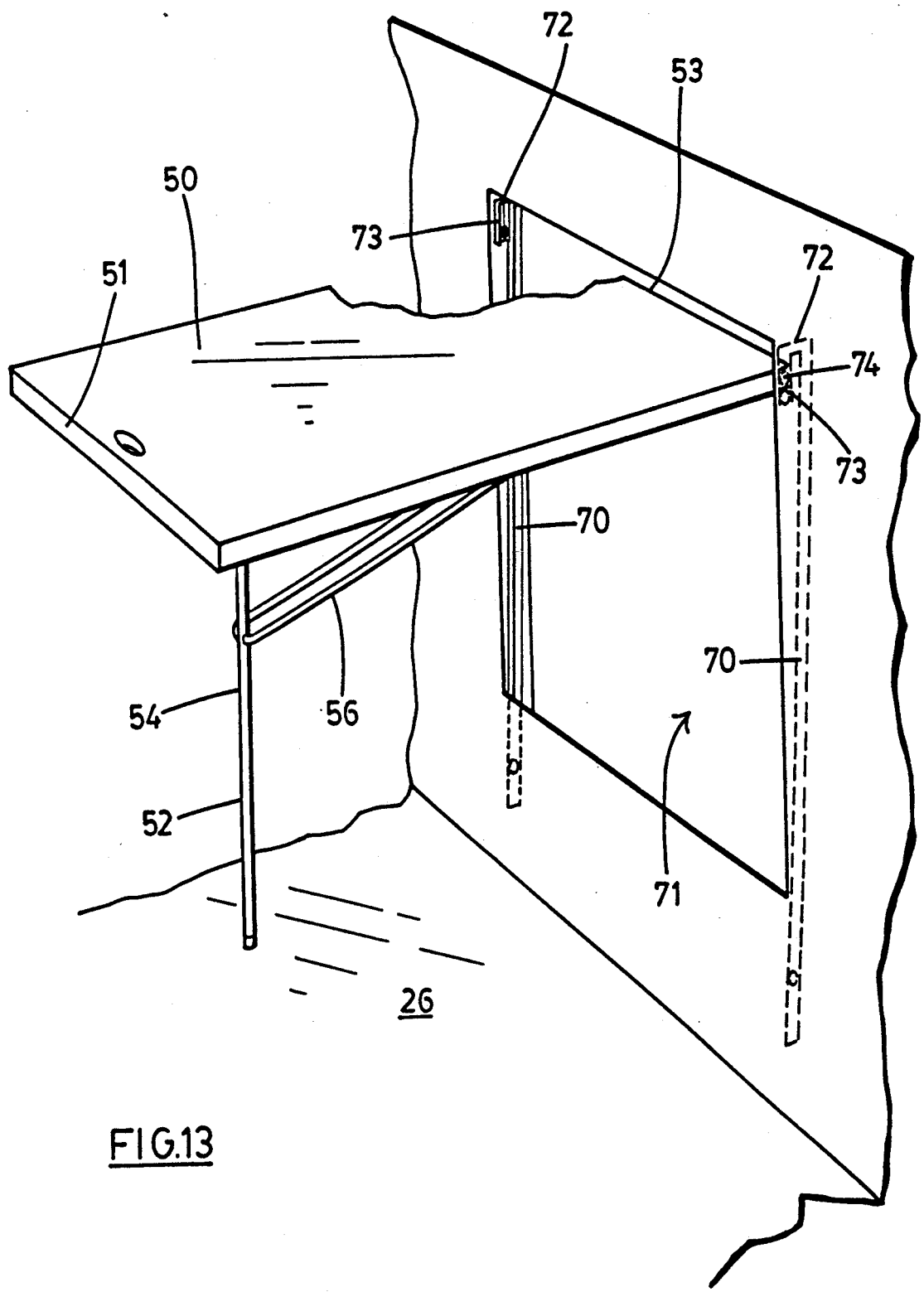
FIG. 13 shows one suitable form of table mechanism.

The long leg portion 54 is pivoted to the underside of the table at a point nearer a free table edge 51. When the table is to be used as such, the long leg portion 54 is pivoted to extend substantially at right angles to the plane of the table 50 to hold it horizontal. In this position, the short leg portion 56 may be utilized as a diagonal bracing strut as shown in FIG. 13.

A rear edge 53 of the table 50 is supported at a wall of the vehicle by means of laterally extending table lugs 74 located in sockets 73 therefor in an alcove 71 in a wall of the vehicle. The area of the alcove 71 is generally coextensive with that of the table 50. Sockets 73 are each formed by a short leg of an inverted U-groove 70 of which the legs are of different lengths and in which the lugs 74 slide for movement between positions of the table 50.

The short leg portion 56 is a U-shaped member having feet 64 extending outwardly from the U. A groove 58 is provided on the underside of the table 50 running at least from the pivot point of the long leg portion 54 towards a rear table edge 53. The groove 58 houses the long leg portion 54 and the short leg portion 56 in the folded away position of the table and, when the table is supported by long leg portion 54, houses the feet 64 of short leg portion 56. The U- shape of the short leg portion 56, which may suitably be made of resilient metal, gives resilience to the short leg portion 56 tending to bias the feet 64 apart against the edges of the groove to hold the diagonal strut firmly. The groove 58 may have a wide portion 62 to house both the short leg portion 56 and a part of the long leg portion 54 but, where it only houses the long leg portion, it may be narrower.

For use as a bed, the long leg portion 54 is folded into the groove 58. The table is disengaged from sockets 73 by lifting the table slightly so that lugs 74 slide upwardly in sockets 73 to reach the webs 72 of the inverted U-grooves 70. The lugs are then slid rearwardly in webs 72 until they reach the top ends of the long legs of grooves 70. The lugs 74 are lowered in grooves 70 until the table is level with the seats. Short leg portion 56 is pivoted to support the table 50. The length of short leg portion 56 is such that the height of the table in its lowered position corresponds with the height of the seats to form a continuous bed surface. The actual width of the seats and width of the table is, of course, dependent on the proportions of the recreational vehicle but may be sufficiently wide as to form a queen bed when the table is in its lowered position.

To provide both for comfort of the passengers and to provide for further bracing of the bed base in the configuration of FIG. 6, or the bed incorporating the table, the seat cushions 60 may be provided with a rigid sheet on their undersurface. The seat cushions are hinged together at an angle to form the seat cushion 60A and the squab 60B for the configurations of the FIGS. 1,2,3,5 and 6 but the two parts are located at 180 degrees to each other in the configuration of FIG. 6 with the rigid surface downwardly. Conveniently the hinged parts are laid with the hinges longitudinally along the length of the bed.

Figure 14:
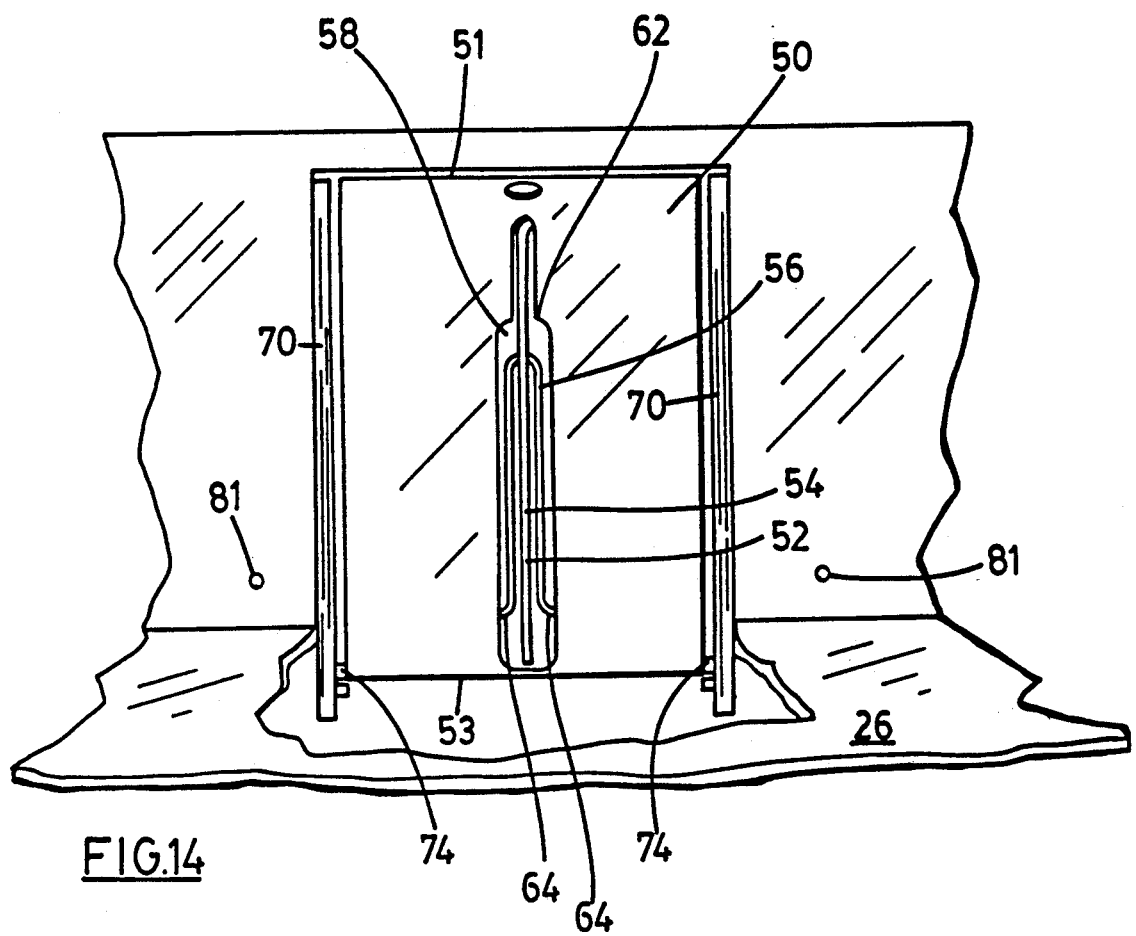
FIG. 14 shows the table of FIG. 13 in folded away position.

When the table is completely folded away as it must be for the configuration of FIGS. 1, 2, 4, 5 and 6, , both the long leg portion 54 and the short leg portion 56 are housed in groove 58. Lugs 74 are further lowered in the long legs of inverted U-groove 70 until the position shown in FIG. 14 is reached. In this position, the rear edge 53 of the table 50 is below lip 75 and the table 50 is located vertically in alcove 71. As shown lip 75 is shown as a physically upstanding lip but it may be provided merely by extending the long legs of groove 70 within a wall cavity siightly below floor level. Groove 70 may slope slightly in the thickness of the alcove 71 from the top and rear of the alcove to the front and bottom of the alcove to locate the table securely in folded away position.

I claim:

1. A seating arrangement for a recreational vehicle having at least one freestanding seat provided with means for individually re-positioning and securing the seat within the vehicle, the seat comprising a seat portion, a back, and a frame; comprising means for individually repositioning and securing the seat comprising a latch to releasable secure each seat to a fixed member of the vehicle, each fixed member comprising a post upstanding from the floor located to be engagable with the latch;

means to open the latch to release the seat for movement to a new position; and means to close the latch to secure the seat in a closed position.

2. A combination seating arrangement as claimed in claim 1 wherein the post includes a stop means to inhibit dislodgement of the latch mechanism upwardly.

3. A combination seating arrangement as claimed in claim 2 wherein said stop means is an enlarged head of the post.

4. A combination seating arrangement as claimed in claim 1 wherein the latch is mounted on the frame of the seat.

5. A combination seating arrangement as claimed in claim 4 in which the latch is mounted on a front cross member of the frame.

6. A combination seating arrangement as claimed in claim 1 comprising two, two-person seats, each of which is provided with said means for individually repositioning and securing the seats.

7. A combination seating arrangement as claimed in claim 6 in which the back of at least one of the seats is flush with a wall of the vehicle when the latch is closed to secure the seat.

8. A combination seating arrangement as claimed in claim 1 in which at least one locating means for the seat is provided.

9. A combination seating arrangement as claimed in claim 8 in which the locating means comprises at least one lug projecting from a rear of the frame for location in a socket of a wall of the vehicle.

10. A combination seating arrangement as claimed in claim 8 in which the locating means comprises at least one lug projecting from a side of the frame for location in a socket of a wall of the vehicle.

11. A combination seating arrangement as claimed in claim 8 in which the locating means comprises at least one lug projecting from a side of the frame for location in a socket of a an adjoining seat.

12. A combination seating arrangement as claimed in claim 6 in which the seats are positionable to form an L-shaped settee.

13. A combination seating arrangement as claimed in claim 6 wherein the seats may be positionable in an aligned manner to form a long settee.

14. An arrangement as claimed in claim 1 in which each post is located for engagement with the latch at a midpoint along the length of each seat from side to side, and at a similar distance from the back of the seat.

15. A combination seating arrangement for a recreational vehicle comprising:
   two, two-person, freestanding seats each provided with means for individually re-positioning and securing the seat within the vehicle, each seat comprising a seat portion, a back, and a frame;
   a table having a top locatable between at least a table position and a folded away position by table locating means:
   means for individually repositioning and securing the seats in opposite relationship spaced apart by the width of the table, the means comprising a latch to releasably secure each seat to a fixed member of the vehicle;
   means to open the latch to release the seat for movement to a new position;
   means to close the latch to secure the seat in a closed position;
   the table locating means comprising:
   a dual purpose leg pivoted to the table and including a long leg portion positionable as a diagonal bracing strut having a length corresponding to the desired height of the table when used as a table, and a short leg portion having a length such as to locate the table at the height of the seat portions;
   lugs locatable in sockets in a wall of the vehicle at a level commensurate with use as a table, and slidable in generally vertical grooves in the wall to pivot the table into a vertical folded away position.

16. An arrangement as claimed in claim 15 in which the long leg portion is pivoted to an underside of the table to move between a position at right angles to the plane of the table to support it and a position folded flat against the table, and the short leg portion is pivoted to the long leg portion to move between a) a position flat against the table when the long leg portion is also folded flat against the table, b) a position at right angles to the table when the long leg portion is folded flat against the table, and c) a position extending as a diagonal strut between the table and the long leg portion when the long leg portion is at right angles to the table.

17. An arrangement as claimed in claim 16 in which the lugs at the rear edge of the table are slidable further in respective generally vertical grooves to locate the table in a vertical folded away position.

18. An arrangement as claimed in claim 17 in which the grooves have sufficient slope to encourage maintenance of the table in folded away position.

19. An arrangement as claimed in claim 13 in which each seat portion is extendable to bed length.

* * * * *